United States Patent [19]

Bell

[11] Patent Number: 4,570,343

[45] Date of Patent: Feb. 18, 1986

[54] PRECISION ALIGNMENT APPARATUS

[76] Inventor: Malcolm E. Bell, 314 Gladmer Park, Regina, Saskatchewan, Canada, S4P 2X2

[21] Appl. No.: 726,237

[22] Filed: Apr. 23, 1985

[30] Foreign Application Priority Data

May 3, 1984 [GB] United Kingdom ............... 8411400

[51] Int. Cl.[4] ............................................. G01B 5/25
[52] U.S. Cl. .................................... 33/1 M; 33/568; 33/180 R
[58] Field of Search ........ 33/1 M, 1 AA, 568, 180 R, 33/143 E, 156 B

[56] References Cited

U.S. PATENT DOCUMENTS

| 3,675,331 | 7/1972 | Ernst et al. | 33/1 M |
| 4,017,187 | 4/1977 | Black | 324/43 R |
| 4,017,791 | 4/1977 | Schwartz | 356/106 LR |
| 4,179,621 | 12/1979 | Crean et al. | 33/1 M |
| 4,254,552 | 3/1981 | Samis | 33/1 M |
| 4,272,892 | 6/1981 | Rose | 33/1 M |
| 4,356,556 | 10/1982 | Sterki | 33/1 M |

Primary Examiner—Willis Little
Attorney, Agent, or Firm—William R. Hinds

[57] ABSTRACT

A precision alignment apparatus for precisely orienting and stabilizing the orientation of a sensor, for example a magnetometer sensor, is disclosed. The simplest embodiment of the invention consists of a sensor support and a second support on which the sensor support is mounted with a trunnion. A wedge engages the two supports on one side of the trunnion axis so that advancement of the wedge will rotate the two supports relative to one another. A lead screw connected to the wedge serves to advance and retract the wedge relative to the supports. Rotation of the two supports is opposed by a stabilization mechanism that can be another wedge and lead screw assembly or a spring. In more complex embodiments an additional support and an additional wedge mechanism are employed for orienting the sensor about another axis. Three axis adjustment is likewise possible.

11 Claims, 3 Drawing Figures

PRECISION ALIGNMENT APPARATUS

FIELD OF THE INVENTION

The present invention relates to apparatus for orienting sensors and other devices and more particularly to a precision alignment apparatus for precisely orienting and stabilizing the orientation of a device such as a sensor.

BACKGROUND

In many sensor applications, sensors and other devices must be precisely oriented and stabilized at the selected orientation for proper operation. This application makes particular reference to magnetometer sensors, but the apparatus described has wide applicability to the precision orientation and stabilization of many other types of devices, including, for example, accelerometers, inclinometers, pressure transducers, load cells, displacement transducers, linear variable displacement transformers and ring laser motion sensors.

Magnetometer applications include mapping the magnetic fields and discriminating magnetic signatures associated with planets, ore bodies, vehicles, submarines, mines and buried unexploded ordnance. These applications require gradiometers, magnetometer sensor arrays, and/or multi-axis magnetometer sensors to obtain sufficient magnetic field data. For multi-sensor applications, measured magnetic field data is only accurate to the degree that the orientation of each sensor is known or to the degree that each sensor can be precisely oriented and stabilized in a predetermined orientation. With other types of sensors it is likewise important to know and to be able to adjust accurately the sensor orientation.

One known mechanism for orienting sensors is a gimbal mounting the sensor, and an adjustment mechanism for adjusting the sensor orientation in the gimbal and holding the gimbal in an adjusted position. The adjusting mechanisms used in the past have not, in practice, provided exceptional accuracy of adjustment or stability. The best of the prior art apparatus known to the applicant is only capable of orienting and stabilizing a sensor to within 0.1 degree of arc. The aim of the present invention is to provide a precision alignment apparatus with considerably improved accuracy.

SUMMARY

According to the present invention there is provided an apparatus for orienting a device about an axis, comprising:
a first support for rigid connection to the device;
a second support;
trunnion means mounting the first support on the second support for rotation of the first support about said axis;
a wedge engaging the first and second supports to one side of the axis and so arranged that advancement of the wedge will rotate the first support about the axis relative to the second support;
a lead screw connected to the wedge and to one of the supports for advancing and retracting the wedge relative to the supports; and
stabilization means engaging the first and second supports and opposing rotation of the first support by the wedge.

In different embodiments, the stabilization means may be a spring or a second wedge arrangement. The second wedge is preferred in most cases since vibrations and shocks can destabilize the spring.

The most preferred embodiments of the invention provide an apparatus for orienting a device comprising:
an inner support;
an intermediate support;
an outer support;
first trunnion means mounting the inner support on the intermediate support for rotation about a first axis;
second trunnion means mounting the intermediate support on the outer support for rotation about a second axis substantially orthogonal to the first axis;
a first pair of wedges engaging the inner support and the intermediate support on opposite sides of the first axis, with the wedges acting to rotate the inner support in opposite directions about the first axis;
a second pair of wedges engaging the intermediate support and the outer support on opposite sides of the second axis with the wedges acting to rotate the intermediate support in opposite directions about the second axis;
first lead screw means associated with each wedge of the first pair for advancing and retracting the wedge relative to the inner and intermediate supports; and
second lead screw means associated with each wedge of the second pair for advancing and retracting the wedge relative to the intermediate and outer supports.

The additional flexibility provided by the double axis arrangement is usually preferred or required.

In all embodiments, appropriate selection of the wedge angles and the lead screw pitch allows adjustment of the sensor orientation to very close tolerances, for example 0.01 degree of arc. The orientation is stabilized by the locking effect of the opposed wedges or, where used, an alternative type of stabilizer.

BRIEF DESCRIPTION OF THE DRAWINGS

In the accompanying drawings, which illustrate an exemplary embodiment of the present invention.

DETAILED DESCRIPTION

Figure 1:
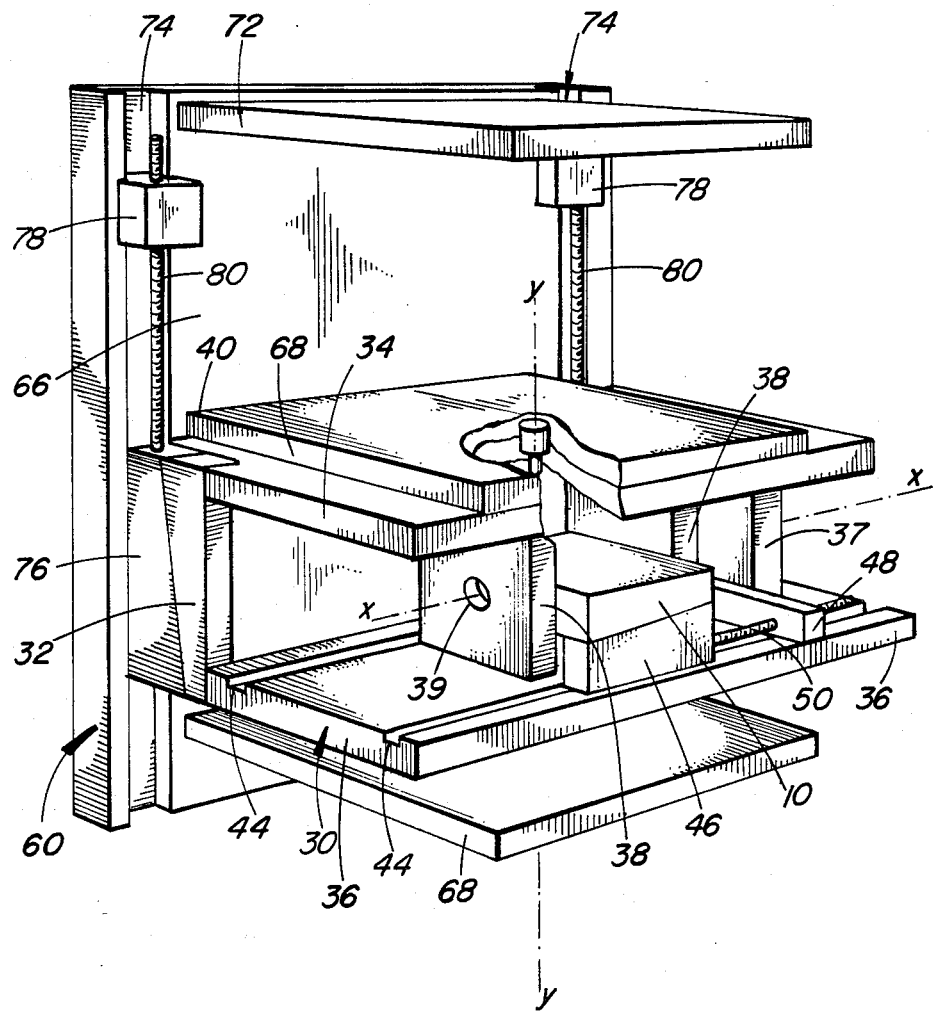
FIG. 1 is a perspective view of a precision alignment apparatus.
Figure 3:
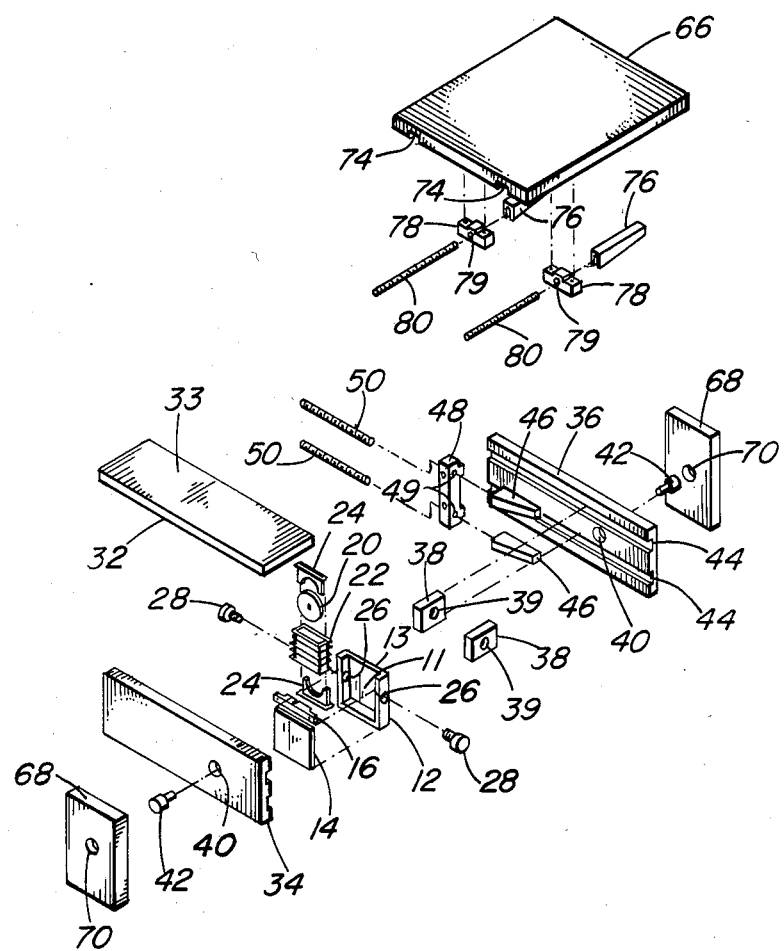
FIG. 3 is an exploded perspective view of the precision alignment apparatus.

Referring to the drawings, and particularly to FIGS. 1 and 3, the illustrated apparatus has three main subassemblies, an inner support 10 housing a sensor, an intermediate support 30 pivotally mounting the inner support and outer support 60 pivotally mounting the intermediate support.

The construction of an exemplary inner support 10 is most clearly illustrated in FIG. 3. In this embodiment, the inner support houses a fluxgate magnetometer. The support includes a housing 12 with a rectangular cavity 11 and tapered back face 13. Cover plate 14 and a sensor retainer 16 close the front side and the top end of the cavity. A fluxgate magnetometer sensor is housed in the cavity 11. The sensor consists of a toroid disc 20, a fluxgate toroidal coil (not shown) a coil bobbin 22 into which the disc and coil slide and a pair of toroid retainers 24 which close the ends of the bobbin.

Opposite sides of the housing 12 have coaxial bores 26 that receive the small diameter ends of stepped trunnion pins 28 that serve for mounting the inner support as will be described in the following.

The intermediate support 30 includes a top plate 32, a front plate 34 and a back plate 36 connected to define a channel containing the inner support 10. The top face 33 of the top plate 32 is tapered from the back to the front for reasons that will be described more fully in the following description of the outer support. Two support brackets 38 are fixed into the channel on opposite sides of the support 10. These brackets have coaxial bores 39 that receive the large diameter ends of trunnion pins 28 to allow pivoting of the inner support 10 about the X—X axis illustrated in FIG. 1. An additional support plate 37 (FIGS. 1 and 2) extends between the front and back plates for reinforcement purposes.

The front and back plates 34 and 36 respectively have aligned bores 40 orthogonal to the X—X axis of trunnion pins 28. The bores 40 receive the small diameter ends of two additional stepped trunnion pins 42.

The back plate 36, which confronts the tapered face 13 of the inner support 10, has two parallel grooves 44 running from end to end. Each groove accommodates a wedge 46 with a wedge angle matching the taper of the face 13 of the inner support 10. The groove spacing is such that the wedges will engage the tapered face 13 of the inner support adjacent its edges. A block 48 is secured to the back plate 36 to bridge the grooves 44. It has two threaded bores 49 that engage respective lead screws 50 so that rotation of each lead screw will advance and retract the screw along a respective one of the grooves 44. The screws are connected at their ends to the respective wedges 46 for driving the wedges along the grooves. Wedge adjustment along the grooves is used to adjust the position of inner support 10 about the axis X—X.

The outer support 60 includes a top plate 66 and side and bottom plates that have not been illustrated for the sake of clarity. These plates define a channel that contains the intermediate support 30 with the free ends of the lead screws 50 accessable through the open top of the channel. Two support brackets 68 are mounted in the channel on opposite sides of the intermediate support. The support brackets 68 have aligned bores 70 receiving the large diameter ends of trunnion pins 42, thus mounting the intermediate support for pivotal movement about the axis Y—Y (FIG. 1) of the pins 42. Axes X—X and Y—Y are orthogonal. The outer top plate 66 has two parallel grooves 74 extending front to back and accommodating respective wedges 76. The wedges have wedge angles matching the taper of the top face 33 of the inner top plate 32. The groove spacing is such that the wedges 76 will engage the tapered face 33 of the intermediate support at positions equidistant from the X—X axis. Two brackets 78 are secured to the plate 66 and bridge the respective grooves 74. Each bracket has a threaded bore 79 engaging a lead screw 80 extending along the groove and coupled to the associated wedge so that rotation of the screw advances and retracts the wedge along the groove to pivot the intermediate support.

As most clearly illustrated in FIG. 1, the outer support has an additional support (72) to contribute to structural rigidity.

With the apparatus described, either the magnetic or the geometric axis of the sensor in the inner support 10 may be oriented precisely. To orient the sensor axis about the X—X axis, the wedges 46 are adjusted in opposite directions. One wedge is first retracted and then the other advanced. This will rotate the inner support about the X—X axis towards the retracted wedge. The engagement of the opposing wedges with the support 10 on opposite sides of the X—X axis stabilizes the position of the support and the sensor. For this purpose, the wedge and lead screw subassembly is self-locking. Adjustment of the sensor orientation about axis Y—Y is performed in the same way. The orientation of the sensor may be verified by known procedures.

Figure 2:
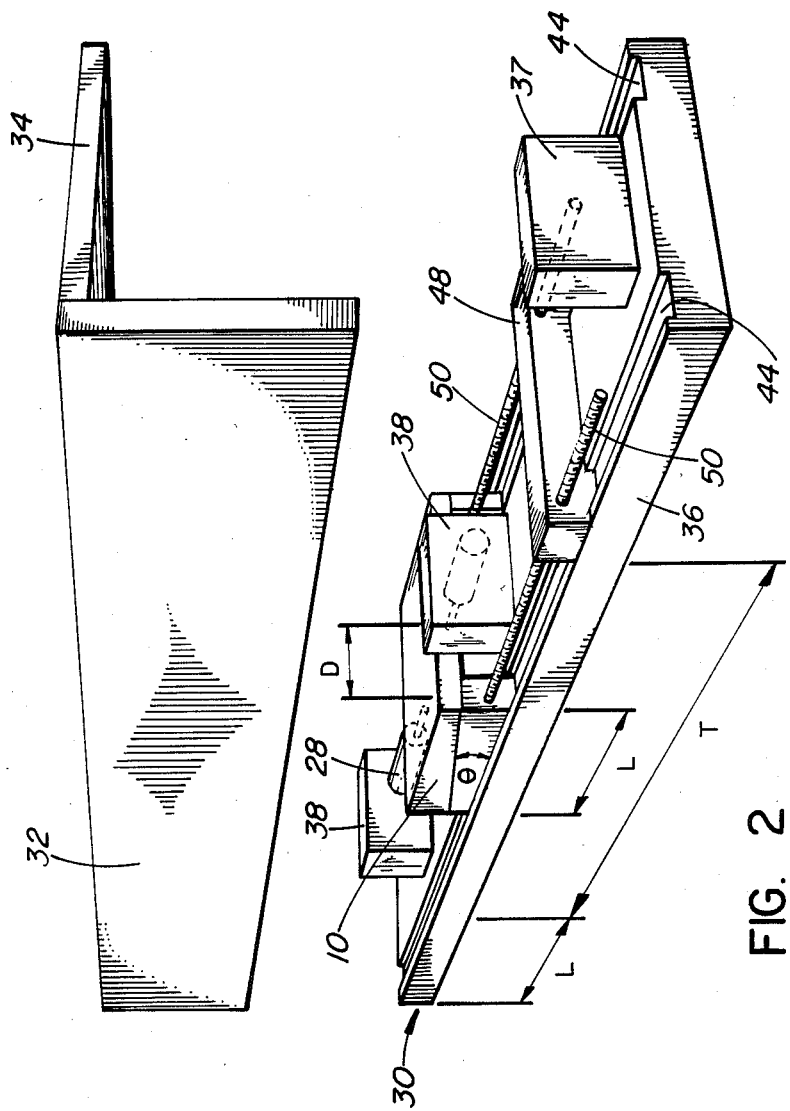
FIG. 2 is a perspective view of an inner assembly of the precision alignment apparatus.

Referring to FIG. 2, the intermediate and inner support assembly has been illustrated with certain applied dimensions as follows:

D is the distance from axis X—X to the line of engagement between the wedge 46 and the support 10;

L is the length of the wedge;

T is the total travel of the wedge;

$\theta$ is the wedge angle;

P is the lead of the lead screw;

R is the orientation range of the inner support expressed as an angle; and p is the precision of adjustment, expressed in terms of angular displacement of the inner support per rotation of the lead screw.

From the geometry of the sub-assembly illustrated in FIG. 2, it can be determined that:

$$R = \sin^{-1}\left[\frac{T \tan \theta}{D}\right]$$

$$p = \sin^{-1}\left[\frac{P \tan \theta}{D}\right]$$

Thus, the range of possible orientations R increases with increases in wedge angle $\theta$ and in the total travel of the wedge, and with decreases in the lateral offset D of the wedges.

Improved precision corresponds to reduced values of p, which means reduced lead screw lead, reduced wedge angle $\theta$ and increased wedge offset D.

It will be appreciated from the foregoing that orientation range, precision and apparatus dimensions must be balanced relative to one another in order to achieve an optimum for any given application. Exemplary values of the various parameters are:

D = 0.844"
L = 2.000"
T = 2.875"
$\theta$ = 0° 20 min
P = 0.025"

which gives:

R = 1.135° and
p = 0.0099° so that an of adjustment of 0.001° is obtainable with 1/10 rotation of the lead screw.

Similar precision can be achieved with the adjustment of the intermediate support about the Y—Y axis.

While the illustrated embodiment provides for orientation about two axes, it is possible to extend the inventive concept to a three axis arrangement with an additional support and wedge arrangement. Likewise, a single axis adjustment apparatus consisting of the subassembly illustrated in FIG. 2 is useful for some purposes.

Because the illustrated embodiment is for the orientation of a magnetic sensor, all parts are manufactured of known non-magnetic and non-conductive material, for example MACOR (TM) machineable glass ceramic manufactured by Corning Glass Works. The parts are suitably held together by titanium screws and locating pins. These materials are non-magnetic, non-conductive, non-porous and their thermal temperature co-efficient expansion matches that of the magnetic sensor.

The apparatus may be used singly or in an array of plural apparatuses. The apparatuses may be mounted orthogonally in various linear, two dimensional or three dimensional arrays. The various apparatuses in an array may be connected directly to one another or through the intermediary of a non-deformable beam or base element. The mounting need not be with any great degree of precision as the apparatus provides for the necessary adjustment with the necessary degree of precision.

What is claimed is:

1. An apparatus for orienting a device comprising:
   an inner support;
   an intermediate support;
   an outer support;
   first trunnion means mounting the inner support on the intermediate support for rotation about a first axis;
   second trunnion means mounting the intermediate support on the outer support for rotation about a second axis substantially orthogonal to the first axis;
   a first pair of wedges engaging the inner support and the intermediate support on opposite sides of the first axis, with the wedges acting to rotate the inner support in opposite directions about the first axis;
   a second pair of wedges engaging the intermediate support and the outer support on opposite sides of the second axis with the wedges acting to rotate the intermediate support in opposite directions about the second axis;
   first lead screw means associated with each wedge of the first pair for advancing and retracting the wedge relative to the inner and intermediate supports; and
   second lead screw means associated with each wedge of the second pair for advancing and retracting the wedge relative to the intermediate and outer supports.

2. An apparatus according to claim 1, wherein the wedges of the first pair travel in respective guide slots in the intermediate support.

3. An apparatus according to claim 2, wherein the guide slots are parallel to the first axis.

4. An apparatus according to claim 3, wherein the second wedges travel in guide slots in the outer support.

5. An apparatus according to claim 4, wherein the guide slots in the outer support are parallel to the second axis.

6. An apparatus according to claim 1, wherein the inner support is a housing for containing a sensor.

7. An apparatus according to claim 6, wherein the intermediate support includes a channel containing the inner support.

8. An apparatus according to claim 7, wherein the outer support includes a channel containing the intermediate support.

9. An apparatus for orienting a device about an axis, comprising:
   a first support for rigid connection to the device;
   a second support;
   trunnion means mounting the first support on the second support for rotation of the first support about said axis;
   a wedge engaging the first and second supports to one side of the axis and so arranged that advancement of the wedge will rotate the first support above the axis relative to the second support;
   a lead screw connected to the wedge and to one of the supports for advancing and retracting the wedge relative to the supports; and
   stabilization means engaging the first and second supports and opposing rotation of the first support by the wedge.

10. An apparatus according to claim 9, wherein the stabilization means is a second wedge engaging the first and second supports on an opposite side of the axis and a second lead screw connected to the second wedge and said one of the supports for advancing and retracting the second wedge relative to the supports.

11. An apparatus according to claim 9, wherein the stabilization means is a spring.

* * * * *